G. J. HICKS.
MOLDING MACHINE.
APPLICATION FILED SEPT. 22, 1914.
1,280,467.
Patented Oct. 1, 1918.
2 SHEETS—SHEET 1.
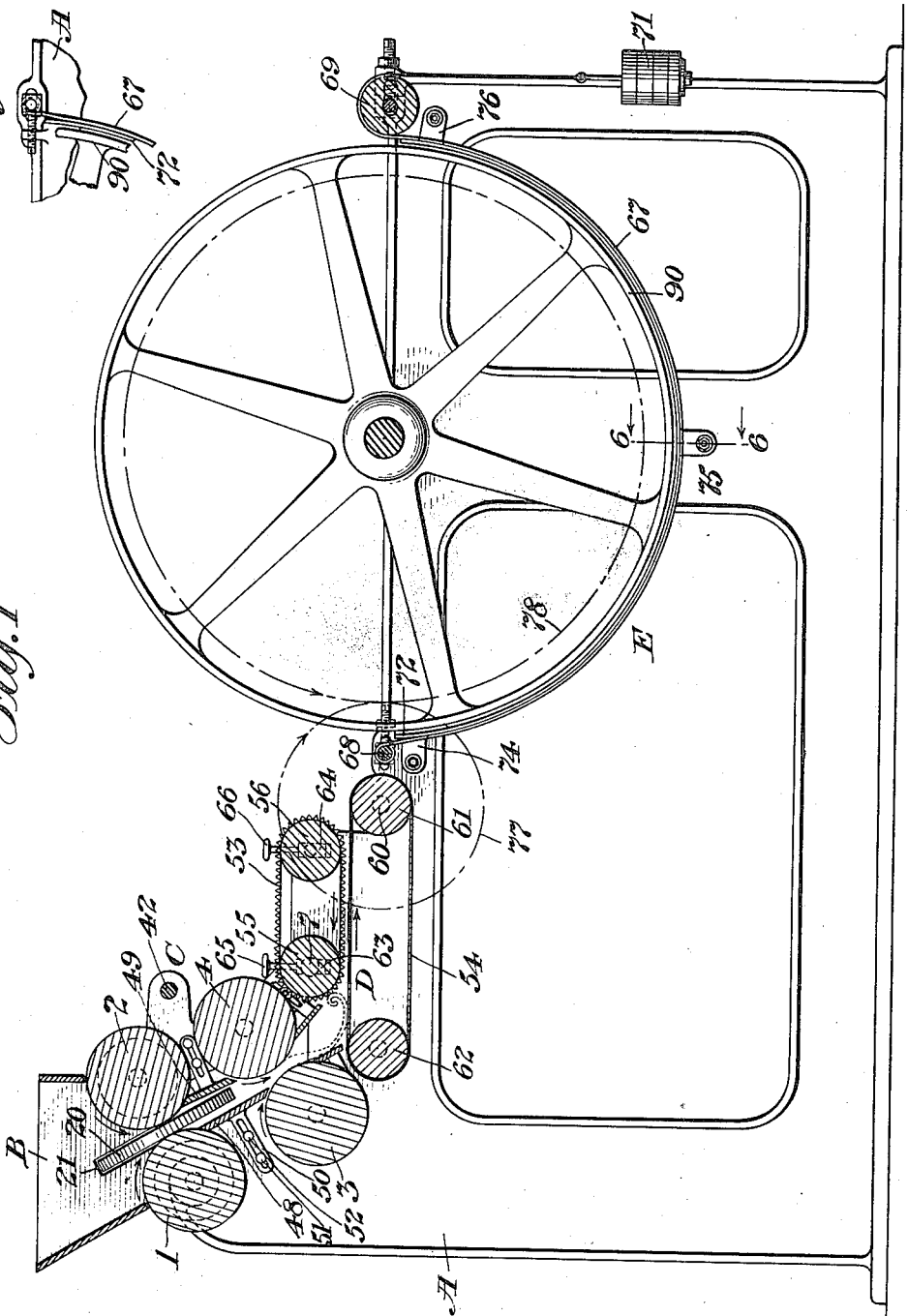
WITNESSES
Chas. F. Clagett
Christyne J. Butler
INVENTOR
George J. Hicks
BY
Chas. F. Davis
HIS ATTORNEY

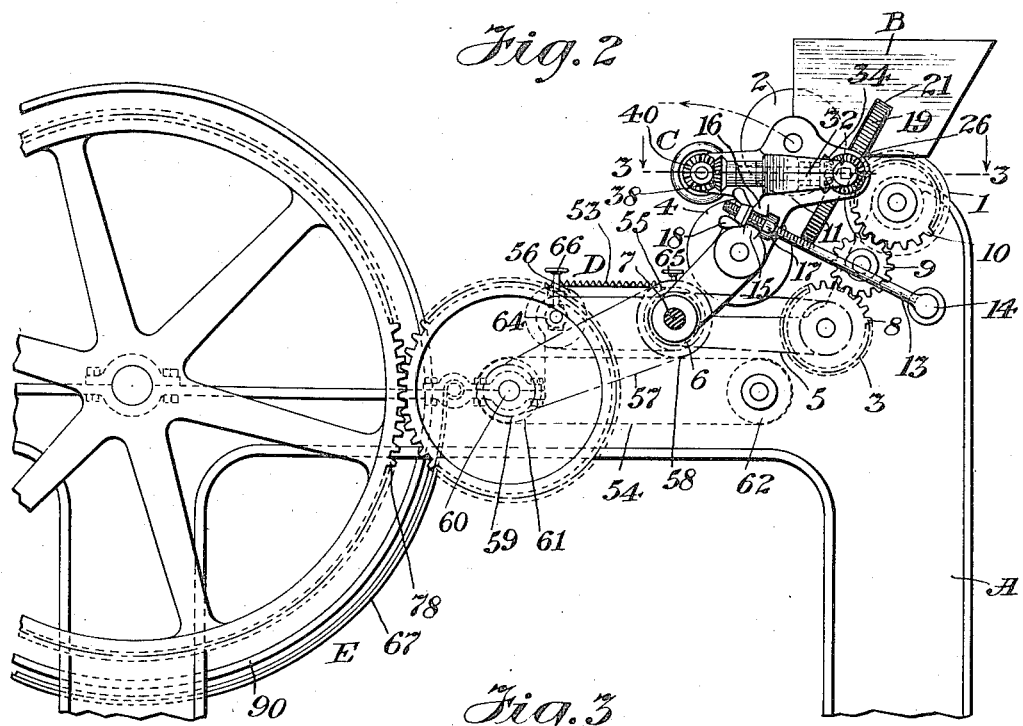
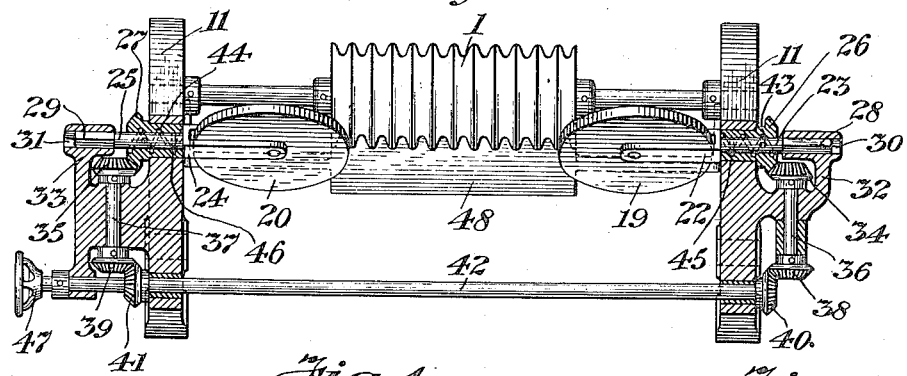
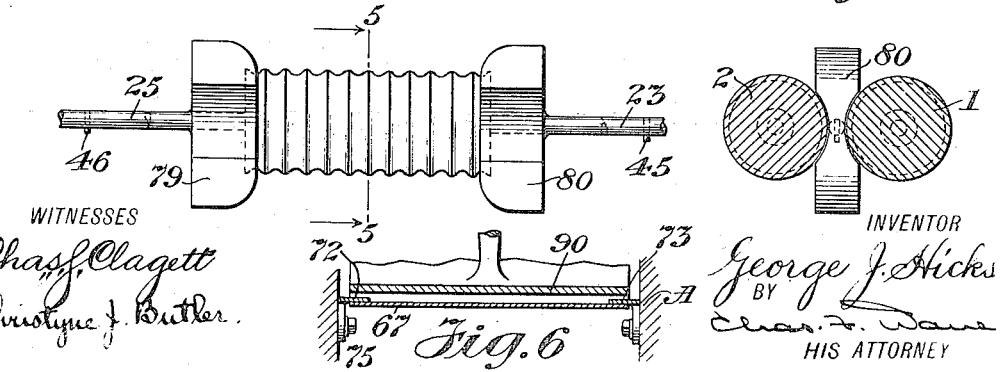

UNITED STATES PATENT OFFICE.

GEORGE J. HICKS, OF SAGINAW, MICHIGAN, ASSIGNOR TO WERNER & PFLEIDERER COMPANY, OF SAGINAW, MICHIGAN.

MOLDING-MACHINE.

1,280,467.

Specification of Letters Patent.

Patented Oct. 1, 1918.

Application filed September 22, 1914. Serial No. 862,895.

*To all whom it may concern:*

Be it known that I, GEORGE J. HICKS, a citizen of the United States, and resident of Saginaw, in the county of Saginaw and State of Michigan, have invented certain new and useful Improvements in Molding-Machines, of which the following is a specification.

This invention relates to improvements in machines for working, shaping and molding plastic substances, and particularly to machines of the type which are especially adapted for the working and molding of dough into loaves.

The several objects and features of the invention will appear from the following detailed description of a construction embodying the same in a preferred form, taken in connection with the accompanying drawings, and specifically pointed out in the claims.

In the drawings:—

Figure 1 is a vertical section of the improved machine;

Fig. 2 is a side elevation looking from the opposite side of Fig. 1;

Fig. 3 is a detailed view, in elevation and section, of part of an improved feeder means, the parts shown in section being taken on the line 3—3 of Fig. 2, looking in the direction of the arrow;

Fig. 4 is a view illustrating a modified form of the construction illustrated in Fig. 3;

Fig. 5 is a section on the line 5—5 of Fig. 4, looking in the direction of the arrow; and Fig. 6 is a section on the line 6—6 of Fig. 1, looking in the direction of the arrow.

Fig. 7 is a detail view showing the adjustable connection of the compression belt of the molding devices with the supporting frame.

Similar reference characters indicate like parts in the several figures of the drawings.

The several parts constituting the machine are mounted upon a suitable frame A, and comprise a hopper B for receiving the dough to be acted upon; a set of feeder rolls, indicated generally at C, which seize the dough fed into the hopper B and convert it into sheet form; a curling device, indicated generally at D, which rolls the sheet of dough into spiral form; and a pressing and molding device, indicated generally at E, which forms the spiral rolls of dough into loaves ready to be put into the baking oven.

The preliminary steps for forming dough are carried out in the usual manner, and after the dough has "risen" and been rolled, it is divided into parts or lumps of the desired weight which are successively placed into a suitably constructed hopper B preferably situated at the upper end of the machine. The lower end of this hopper opens upon two sets of feeder rolls, 1—2 and 3—4, which seize the dough from the hopper and convert it into a relatively thin sheet, which sheet is then curled into a spiral roll by the curling device situated below the feeder rolls 3 and 4. The rolls 1 and 3 are journaled in suitable bearings carried by the frame A, and are rotated in the direction shown by the arrows, the roll 3 being driven by a chain 5 (see Fig. 2) passing over a sprocket wheel 6 carried by the main motor shaft 7, and the roll 1 being driven from said roll 3 through a suitable train of gearing 8—9—10.

The feeder rolls 2 and 4 are journaled in an adjustable frame for adjustment toward and from the rolls 1 and 3 to regulate the thickness of the sheets of dough fed therebetween. This adjustable frame as here shown comprises two end brackets 11, 11, which are pivotally mounted at their lower ends on the motor shaft 7, so that swinging movement of the same will move the supported rolls 2 and 4 toward and from the rolls 1 and 3. The frame and supported rolls are maintained in adjusted position by means of an adjusting rod, such as 13, engaging with the frame. This adjusting rod is pivotally connected at one end with a fixed support, as at 14, and at its opposite end is screw-threaded and provided with two adjusting nuts 17 and 18, engaging with the opposite sides of a pair of spaced ears 15 and 16 on one of the brackets 11, between which the rod is removably seated as shown. By adjusting the nuts 17 and 18 back and forth on the rod 13 a corresponding adjustment of the swinging frame may be effected to thereby shift the supported rolls 2 and 4 toward and from the opposing rolls 1 and 3, and by disconnecting the rod 13 from said frame, which may be accomplished by a laterally outward movement of the rod from between the ears 15 and 16, the frame with its supported rolls may be swung backwardly from the opposing rolls to completely open up the space between said rolls and so permit of the ready and convenient cleaning of the same.

In dough-molding machines as hitherto constructed, it has been the custom to build different sizes of machines for the molding of different sizes of loaf. The disadvantage of this lies in the fact that where there is a demand for loaves of different sizes ranging from the small loaf commonly sold, to the long French and Vienna loaves, it has been found necessary to employ several machines. Bakers have sought to avoid this duplication by adjustment of the pressure upon the dough masses, but this method has proved to be very unsatisfactory for the obvious reason that there is no means of positively ascertaining just what degree of pressure will produce a certain size loaf, and the result has been that the loaves molded by the machine were of uneven sizes and texture. To avoid unnecessary duplication of machinery and at the same time permit the making of loaves of different sizes, ranging from the smallest to the long French loaf, I have provided a machine which is positively adjustable to any of the different sizes required and at the same time does not require any attachments or the like, and may be quickly and easily adjusted from one size to another. This I accomplish by the provision of means for varying the effective working area of the rolls which convert the dough masses into sheets, so that positive regulation of the width of the sheet and consequently of the completed loaf is obtained. In this way the desired adjustment as to length of loaf is attained, without depending upon the use of pressure, an uncertain quantity at best and tending when applied to destroy the texture of the loaf.

Referring particularly now to Figs. 2 and 3, between the feeder rolls, preferably between rolls 1 and 2, is a pair of disks 19 and 20, which extend through slots 21 in the hopper C. These disks are simultaneously adjustable toward and from each other and act to vary the effective working area of the rolls which convert the lumps of dough into sheets, and in this way adjust the width of the sheets. The adjustment of the disks as here shown is accomplished as follows: The disk 19 is journaled in a U bracket 22 carried at the end of a shaft 23, and the disk 20 is similarly mounted in a bracket 24 at the end of a shaft 25. Both shafts 23 and 25 pass through the hubs of gears 26 and 27 journaled in the brackets 11, and are provided with squared or other non-circular ends, 28 and 29, which extend into similarly shaped holes 30 and 31 in extensions 32 and 33 of the brackets 11. The gears 26 and 27 are adapted to mesh with gears 34 and 35 on the inner ends of shafts 36 and 37 rotating in bearings formed by extensions of the brackets 11. These shafts carry at their outer ends gears 38 and 39, meshing with gears 40 and 41 on a rod 42 passing through bearings in the brackets 11. The gears 26 and 27 are provided with internal spiral grooves 43 and 44 which receive pins 45 and 46 carried by the shafts 23 and 25. It will thus be seen that rotation of the gears 26 and 27 will cause the pins to travel in said grooves and consequently move the shafts and supported disks in a direction lengthwise of the rolls 1 and 2, rotation of said shafts when so moved being prevented by the squared ends 28 and 29. The gears 26 and 27 are simultaneously rotated through their described connection with the rod 42, when said rod is turned. For convenience in rotating said rod, I provide the same at one end thereof with a hand wheel 47. It will be noted that I have thus provided adjustable devices which are operative to vary the effective working area of the feeder rolls and thereby limit and define the width of the sheet of dough passing between the rolls; in this way providing a positive means for determining the length of the completed loaf. By adjustment of the rolls 2 and 4 toward and from the rolls 1 and 3, I also obtain a regulation of the thickness of the sheet, and hence of the completed loaf.

I prefer to utilize corrugated rolls for a number of the feeder rolls and, in the present instance, I have shown the first two feeder rolls, 1 and 2, as being corrugated in form. Associated with these rolls are scrapers 48 and 49 having corrugated edges conforming to the corrugated surface of the rolls as clearly shown in Fig. 3. These scrapers are adjustably mounted on the frame A, as by means of slotted brackets 50, held in place by set-screws 51 and 52. The advantages of utilizing corrugated rolls and scrapers are many. Among these may be mentioned the fact that only the high points of the rolls come into contact with the dough to any considerable extent, whereby liability of the rolls becoming coated with gluten to any objectionable extent is reduced to a minimum. Also, the relatively narrow ribs of the rolls operate to penetrate the dough to a greater or less extent and break down the large cells of fermentation which are the common cause of blistering of the loaf after being baked, and these ribs obviously perform such function with less pressure on the dough than would be required with the use of the ordinary non-corrugated rolls. Furthermore, as to the scraper, it has been found in practice that in scraping the long straight surface of the ordinary roll, a very stiff piece of metal is required which frequently becomes more worn on one end than the other and so resulting in incomplete scraping of the roll and consequent undue sticking of the dough to it. In the use of a corrugated roll and scraper, the scraper operates on the roll with a combing action and has been found to be more effective as a cleaning means for the roll than the ordinary straight-edged scraper.

The dough having been converted into sheet form by the action of the rolls above described, it passes to the curling mechanism for the purpose of being rolled into spiral form. This curling mechanism comprises a pair of belts 53 and 54 adapted to be driven in opposite directions, as shown by the arrows in Fig. 1, the lower belt 54 being arranged with one end of its upper run in a position beneath the pass between the rolls to receive the dough sheet as it is delivered therefrom and being operated to move in a direction toward the pressing and molding device E, and the upper belt 53 being located slightly forward of the dough receiving end of the lower belt and being operated to move in a direction opposite that of the latter to engage with the forward end of the dough sheet and curl the same in the manner shown in Fig. 1. These belts are each preferably formed of slats attached to chains or similar flexible carriers, the slats of the lower belt being formed to present a smooth surface at the upper or dough receiving run of the belt, and the slats of the upper belt being V-shaped in cross-section to present a roughened dough-engaging surface. With this construction and arrangement of the belts, when the front end of a sheet of dough is brought by the lower belt into contact with the V-shaped slats of the oppositely moving upper belt, it is given a curling movement by the latter as shown in Fig. 1. After the sheet has been curled or rolled up it is then drawn between the belts by the lower one and delivered to the molding device E, the passage of the rolled dough into the space between the belts being readily permitted by a slight upward yielding of the upper belt under pressure of the dough mass being drawn thereunder by the action of the lower belt. The action of these two belts on the dough mass passed between them is such as to effect a preliminary elongation of the mass prior to its final elongation by the molding device E.

The upper belt 53 passes over a pair of pulleys 55 and 56, the pulley 55 being connected to and driven by the motor shaft 7. The lower belt 54 passes over a pair of pulleys 61 and 62 and is driven in a direction opposite that of the belt 53 by means of a drive belt 57 engaging at one end with a drive pulley 58 on the motor shaft 7 and at its opposite end with a pulley 59 on the shaft 60 carrying the pulley 61.

The upper belt 53 is vertically adjustable relatively to the lower belt in order to vary the width of the dough-receiving pass therebetween, and this adjustment is preferably a yielding one in order that the upper belt may yield slightly to permit of the dough mass being readily drawn into the pass between the belts as hereinbefore referred to. Any suitable means may be employed to provide this arrangement, the means here shown comprising spring-held journal boxes 63 and 64 for the rolls carrying the belt 53, and coöperating adjusting screws 65 and 66.

The molding device E as here shown comprises the molding drum 90 and the coöperative compression belt 67, between which parts the spirally wound mass of dough is rolled and shaped until it emerges from the machine in the form of a loaf ready for the oven. The compression belt may be of any suitable material or construction, the same preferably being formed of a chain or chains with attached slats. This belt is connected at the receiving end thereof to a bar 68 adjacent the delivery end of the belt 54 at the front side of the drum and from thence passes around the lower part of the drum to a roller 69 located at the rear side thereof and at a point in about line with the horizontal center of the drum. The belt passes over this roller 69 and at its free end is provided with a weight-hanger carrying removable weights 71, these weights serving to hold the belt in adjustable relation to the drum according to the degree of compression to be applied to the dough masses. The bar 68 and roller 69 by which the belt is supported at opposite sides of the drum are both suitably supported on the frame for adjustment toward and from the drum in order to vary the space between the same and the drum according to the size of the dough masses to be acted upon, the belt between these supports being yieldable and therefore automatically adjustable to the varying sizes of the dough masses. To prevent the weights from holding the belt in direct contact with the drum which would interfere with the proper passage of the dough mass through the molding device, I provide a pair of semicircular plates 72 and 73 (see Fig. 6) which are supported by brackets 74, 75 and 76 on the frame in position to engage with the belt at opposite ends of the drum and keep it spaced a suitable distance from the latter.

The drum 90 of the molding device is rotated toward the discharge end of the machine by means of a gear 77 driven by the shaft 60 and meshing with a large gear 78 carried by the drum. As the spirally wound mass of dough emerges from the curling mechanism and is delivered into the space between the belt and the drum, it is engaged by the latter and rolled between it and the belt until it emerges from the machine in the form of a completely molded loaf; the belt acting on the dough mass throughout such molding process with uniform pressure and being readily yieldable to any variation in the size or form of the mass being molded.

In Figs. 4 and 5, there is shown a modified means for adjusting the width of the dough sheet. In this instance the disks are substituted by wedges 79 and 80 slidably adjusted with respect to the rolls 1 and 2 in the same manner as indicated in Fig. 3.

It will be understood that the improvements herein described are not to be limited to the particular form of machine illustrated, nor to the particular use named, as they are of equally valuable application in other arts and are capable of wide modification without departing from the spirit and scope of the invention.

What I claim is:—

1. In a dough molding machine, the combination with means for molding the dough masses into loaves, of coöperating rolls for feeding the dough masses to said aforementioned means, and plate-like elements arranged between said rolls to determine the widths of the dough masses passing between said rolls, the dough engaging faces being movable with the dough masses.

2. In a dough molding machine, the combination with means for molding the dough masses into loaves, of rolls for feeding the dough masses to the aforementioned means, and rotatable plate-like elements arranged between said rolls with their faces parallel to the axes of the rolls for varying the widths of the dough masses passing between said rolls.

3. In a dough molding machine, the combination with means for molding the dough masses into loaves, of means for feeding the dough masses to said aforementioned means, and means having moving dough-engaging faces for varying the widths of the dough masses.

4. In a machine for working and shaping plastic material, the combination of rolls for converting the material into sheets, and means for varying the effective working area of said rolls whereby adjustment of the width of said sheets is obtained, said last mentioned means having dough-engaging faces movable under the influence of the moving dough masses.

5. In a dough molding machine, the combination with means for molding the dough masses into loaves, of coöperating rolls for feeding the dough masses to the aforementioned means, and disks arranged between the rolls for regulating the widths of the dough masses passing between the rolls, the axes of said disks extending at right angles to the axes of the rolls.

6. In a machine for working and shaping plastic material, the combination of rolls for converting the material into sheets, and adjustable devices extending between said rolls and having moving dough engaging faces for limiting the width of said sheets.

7. In a machine for working and shaping plastic material, the combination of rolls for converting the material into sheets said rolls being adjustable to regulate the thickness of said sheets, and adjustable means having dough-engaging faces movable to assist in the feeding of the dough for varying the length of the pass between said rollers.

8. In a machine for working and shaping plastic material, the combination of rolls for converting the material into sheets, and means comprising movable disks having their axes extending in angular relation to the axes of the feeding rolls and adjustable between said rolls for varying the width of said sheets.

9. In a dough-molding machine, the combination of devices which preliminarily treat the dough masses and convert them into spiral rolls, and molding mechanism for forming said rolls into completed loaves comprising a molding drum, a yieldable and flexible compression belt for keeping the dough in contact with said drum during the working and molding thereof, means for preventing contact of the belt with said drum and means tending to maintain the belt in contact with the last mentioned means.

10. The improved dough-molding machine comprising a pair of rolls for converting the dough masses into sheets, means having moving dough engaging faces for adjusting the length of the pass between said rolls, a curling and conveying device for rolling said sheets into spiral form, and molding mechanism for receiving said spiral rolls from said conveying device and forming them into completed loaves.

11. Molding mechanism for dough molding machines and the like, comprising a rotary drum, a flexible belt disposed in parallel relation with a portion of the surface of the drum, spacing means for holding the belt spaced from the surface of the drum, and means for yieldingly holding the belt against said spacing means.

12. Molding mechanism for dough molding machines and the like, comprising a rotary drum, a flexible belt disposed in parallel relation with a portion of the surface of the drum, spacing means comprising members engaging only with the edge portions of the belt for holding the belt spaced from the surface of the drum, and means for yieldingly holding the belt against said spacing means.

13. In a dough molding machine, the combination with means for molding the dough masses into loaves, of a dough hopper, rolls for feeding the dough masses from the hopper to the molding means, and rotatable disks for regulating the widths of the dough masses passing between said rolls, said disks being arranged between said rolls and extending into the dough hopper, the axes of the disks extending at right angles to the axes of the rolls.

14. In a dough molding machine, means for molding the dough into loaves, means for feeding the dough masses to the molding means, and means to vary the widths of the dough masses and to assist in the feeding of the dough masses.

Signed at Saginaw, in the county of Saginaw and State of Michigan, this 17th day of Sept., A. D. 1914.

GEORGE J. HICKS.

Witnesses:
   E. WALZEL,
   E. C. BLACKWELL.